United States Patent
Kuroiwa (10) Patent No.: US 12,552,489 B2
(45) Date of Patent: Feb. 17, 2026

(54) MOTOR CONTROL METHOD, FLUID SUPPLY DEVICE, VEHICLE HEIGHT ADJUSTMENT DEVICE, AND SADDLE-TYPE VEHICLE

(71) Applicant: Hitachi Astemo, Ltd., Hitachinaka (JP)

(72) Inventor: Naoya Kuroiwa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 490 days.

(21) Appl. No.: 18/299,391

(22) Filed: Apr. 12, 2023

(65) Prior Publication Data

US 2023/0242207 A1  Aug. 3, 2023

Related U.S. Application Data (63) Continuation of application No. PCT/JP2020/044005, filed on Nov. 26, 2020.

(51) Int. Cl.
| | |
|---|---|
| B62K 25/16 | (2006.01) |
| B60G 17/027 | (2006.01) |
| B62K 25/04 | (2006.01) |
| B62K 25/20 | (2006.01) |
| H02P 29/00 | (2016.01) |

(52) U.S. Cl.
CPC .......... *B62K 25/16* (2013.01); *B60G 17/0272* (2013.01); *B62K 25/20* (2013.01); *H02P 29/00* (2013.01); *B62K 2025/045* (2013.01)

(58) Field of Classification Search
CPC ... B62K 25/16; B62K 25/20; B62K 2025/045
USPC ...................................................... 280/5.514
See application file for complete search history.

(56) References Cited

U.S. PATENT DOCUMENTS

| | | | | |
|---|---|---|---|---|
| 8,408,561 | B2* | 4/2013 | Mochizuki ........... | B60G 17/027 280/124.16 |
| 10,654,331 | B2* | 5/2020 | Murakami ............ | B60G 17/08 |
| 11,760,149 | B2* | 9/2023 | Kuroiwa ................ | F16H 25/24 280/5.514 |

(Continued)

FOREIGN PATENT DOCUMENTS

| | | |
|---|---|---|
| EP | 2111512 B1 | 2/2011 |
| JP | 2010149551 A | 7/2010 |

(Continued)

OTHER PUBLICATIONS

International Search Report mailed Feb. 2, 2021 for the corresponding PCT Application No. PCT/JP2020/044005 (5 pages including English translation).

(Continued)

*Primary Examiner* — Valentin Neacsu
*Assistant Examiner* — Hosam Shabara
(74) *Attorney, Agent, or Firm* — Leason Ellis LLP; Edward J. Ellis; Melvin C. Garner (57) ABSTRACT

A motor control method includes a determination step of determining whether a contact portion exists, which is a portion where the screw and the nut member are in contact with each other at a location different from a mating portion, when the motor is energized to move the nut member in a first direction, and when the contact portion is determined to exist in the determination step, a return step of energizing the motor to move the nut member in a second direction opposite to the first direction until the contact portion no longer exists.

20 Claims, 8 Drawing Sheets

(56) References Cited

U.S. PATENT DOCUMENTS

| | | | |
|---|---|---|---|
| 12,017,496 B2 * | 6/2024 | Tokuhara | B60G 17/0272 |
| 12,030,582 B2 * | 7/2024 | Tokuhara | B62K 25/04 |
| 12,134,294 B2 * | 11/2024 | Matsubara | B60G 17/019 |
| 2010/0101913 A1 | 4/2010 | Schuler et al. | |
| 2011/0101632 A1 | 5/2011 | Mochizuki | |
| 2019/0001776 A1 | 1/2019 | Murakami et al. | |
| 2022/0203795 A1 | 6/2022 | Tokuhara | |
| 2022/0203798 A1 | 6/2022 | Kuroiwa | |

FOREIGN PATENT DOCUMENTS

| | | | |
|---|---|---|---|
| JP | 2018144650 A | 9/2018 | |
| JP | 6738510 B | 8/2020 | |
| JP | 6789444 B1 | 11/2020 | |

OTHER PUBLICATIONS

German Office Action mailed Sep. 30, 2025 for the corresponding German Patent Application No. 12020007518.4; 13 pages including English translation.

* cited by examiner

VEHICLE BODY SIDE ←——→ WHEEL SIDE

MOTOR CONTROL METHOD, FLUID SUPPLY DEVICE, VEHICLE HEIGHT ADJUSTMENT DEVICE, AND SADDLE-TYPE VEHICLE

CROSS REFERENCE TO RELATED APPLICATIONS

This application is a Continuation of International Patent Application No. PCT/JP2020/044005 filed on Nov. 26, 2020, the content of which is incorporated herein by reference in its entirety.

FIELD OF THE INVENTION

The present invention relates to a motor control method, a fluid supply device, a vehicle height adjustment device, and a saddle-type vehicle.

BACKGROUND OF THE INVENTION

In recent years, a device has been proposed to adjust a height of a vehicle body of a vehicle (vehicle height) for the purpose of preparing a posture of the vehicle and for other purposes.

For example, a vehicle height adjustment device described in JP2010-149551A is configured as follows. That is, a pump which feeds or drains operating fluid to or from a jack chamber includes a pump chamber which is partitioned with a cylinder and a piston which is slidably inserted in the cylinder, the pump chamber communicating with the jack chamber, and drive means for driving the piston in an axial direction with respect to the cylinder. The drive means includes a nut which is located on an anti-pump chamber side of the piston and supports the piston from the anti-pump chamber side, and a guide member made of resin which has a cylindrical shape and is, while being prevented from rotating with respect to the cylinder, in slide-contact with an outer periphery of the nut to prevent the nut from rotating with respect to the cylinder and allow only a movement of the nut in an axial direction. The drive means is equipped with a screw shaft which is rotationally driven with a tip end side screwed into the nut and a base end connected to a driving source and includes a sliding portion which slides to an end portion on an anti-piston side of the guide member in the middle.

A vehicle height adjustment device described in JP6738510B is provided with an adjustment unit for adjusting a vehicle height. The adjustment unit is provided in a suspension device and includes a jack unit for adjusting a length of a spring and a supply device as an example of a fluid supply device for supplying oil to a jack chamber of the jack unit. The jack unit includes a support member for supporting an end portion on a vehicle body side of the spring and a formation member for forming the jack chamber together with the support member. The length of the spring is adjusted by moving the support member according to an amount of oil in the jack chamber. The jack unit includes a movement amount sensor for detecting a movement amount of the support member. The supply device includes a housing for storing oil, a piston for sliding in the housing, a motor, a speed reducer which slows down a rotation speed of the motor, and a screw connected to an output shaft of the speed reducer. The supply device is formed with a female thread which meshes with a male thread formed on the screw, and includes a nut which moves in a rotation axis direction as the screw rotates. The supply device includes an intervening member intervening between the nut and the piston to restrain the nut from rotating as the screw rotates. The control device controls the movement amount of the support member of the jack unit and an initial load of the spring by controlling the motor of the supply device.

For example, in the vehicle height adjustment device described in JP6738510B, when the control device is configured to stop driving the motor when the movement amount of the support member detected by the movement amount sensor reaches a target value, for example, if the movement amount sensor is out of order, even if the movement amount of the support member reaches the target value, energizing the motor does not stop. Therefore, when driving the motor to discharge the oil from the jack chamber, for example, when the movement amount sensor is out of order, the nut will hit the screw. To prevent an excessive load on the motor due to the nut hitting the screw, when the control device detects that the nut hits the screw, the device stops energizing the motor. When energizing the motor is stopped, a gear of the speed reducer intervening between the motor and the screw rotates in an opposite direction by an amount of backlash and stops. Then, for example, when after a power of the vehicle height adjustment device is turned off, the power is turned on again, and the motor is energized to rotate the motor in a direction to discharge the oil from the jack chamber so that the movement amount of the support member becomes the target value, after the motor rotates under no load and the rotation speed increases, teeth of the gears of the speed reducer are meshed. However, when the teeth of gears of the speed reducer are meshed, the nut and screw are in a hitting state. Therefore, the screw does not rotate, and the teeth of the gears of the speed reducer will receive a large impact, which may reduce durability of the gears. Alternatively, after the teeth of gears of the speed reducer are meshed, the nut tries to rotate further, increasing a contact pressure between the nut and screw, which may reduce the durability of the nut or screw.

SUMMARY OF THE INVENTION

An object of the present invention is to provide a motor control method and the like which can improve durability of components forming a device for supply fluid.

As a result of intensive studies, the inventors of the present invention have found that when a nut and a screw are in a hitting state, if a gear of a speed reducer is operated in a direction which increases a contact surface pressure between the nut and screw, a situation may occur in which durability of the gear, the nut, and the screw (hereinafter sometimes referred to as the "gear and the like") may be lowered. By such finding, as a result of earnestly examining a configuration which enables durability improvement of the gear and the like, the inventors have found that, when the nut and the screw hit each other, it is possible to improve the durability of the gear and the like by taking steps to eliminate a state in which the nut and the screw hit each other by rotating the gear in a direction to eliminate the hitting state between the nut and the screw. The present invention was completed based on such findings. The present disclosure will be described below.

An aspect of the present disclosure is a motor control method including, in controlling an operation of a motor in a fluid supply device including the motor, a speed reducer connected to an output shaft of the motor, a screw connected to the speed reducer, a nut member which is fitted to the screw and moves in an axial direction of a rotation shaft of the screw as the screw rotates, a piston movable in the axial direction due to the nut member moving in the axial direction, and a storage chamber configured to store fluid of which a capacity increases or decreases as the piston moves in the axial direction, a determination step of determining whether a contact portion exists, which is a portion where the screw and the nut member are in contact with each other at a location different from a mating portion, when the motor is energized to move the nut member in a first direction, and when the contact portion is determined to exist in the determination step, a return step of energizing the motor to move the nut member in a second direction opposite to the first direction until the contact portion no longer exists.

Here, in the determination step, whether the contact portion exists may be determined using a value of current supplied to the motor.

Another aspect of the present disclosure is a fluid supply device including a motor, a speed reducer connected to a rotation shaft of the motor, a screw connected to the speed reducer, a nut member which is fitted to the screw and moves in an axial direction of the rotation shaft of the screw as the screw rotates, a piston movable in the axial direction due to the nut member moving in the axial direction, a storage chamber configured to store fluid of which a capacity increases or decreases as the piston moves in the axial direction, and a control device configured to control an operation of the motor, in which the control device includes a determination unit configured to determine whether a contact portion exists, which is a portion where the screw and the nut member are in contact with each other at a location different from a mating portion, and when the determination unit determines that the contact portion exists while the motor is energized to move the nut member in the first direction, the control device is configured to energize the motor to move the nut member in a second direction opposite to a first direction until the contact portion no longer exists.

Here, the determination unit may determine whether the contact portion exists by using a value of current supplied to the motor.

The contact portion may include a first surface provided on the screw and extending in a direction intersecting the rotation shaft, and a second surface provided on the nut member and extending to face the first surface.

The contact portion may include an elastic member having elasticity in the axial direction, and the screw and the nut member may be in contact with each other through the elastic member.

The control device may make an absolute value of a second current value smaller than an absolute value of a first current value until the contact portion no longer exists, the second current value being supplied to the motor when moving the nut member in the first direction, the first current value being supplied to the motor when moving the nut member in the second direction.

Still another aspect of the present disclosure is a vehicle height adjustment device including the fluid supply device according the aspect described above, and a changing unit configured to change a length of a spring of a suspension device disposed between a vehicle body and a wheel using the fluid supplied by the fluid supply device.

Still another aspect of the present disclosure is a saddle-type vehicle including a vehicle body, a front wheel disposed on a front side of the vehicle body, and a rear wheel disposed on a rear side of the vehicle body, a first suspension device disposed between the vehicle body and the front wheel, a second suspension device including a spring disposed between the vehicle body and the rear wheel, and the vehicle height adjustment device capable of adjusting a load of the spring in the second suspension device using the fluid supplied by the fluid supply device according to the aspect described above.

Advantageous Effects of Invention

According to the present invention, durability of a component which forms an apparatus which supplies a fluid can be improved.

DETAILED DESCRIPTION OF THE INVENTION

Hereinafter, embodiments of the present invention will be described in detail with reference to the accompanying drawings. Forms described below are examples of the embodiment of the present invention, and the present invention is not limited to the forms described below.

First Embodiment

Figure 1:
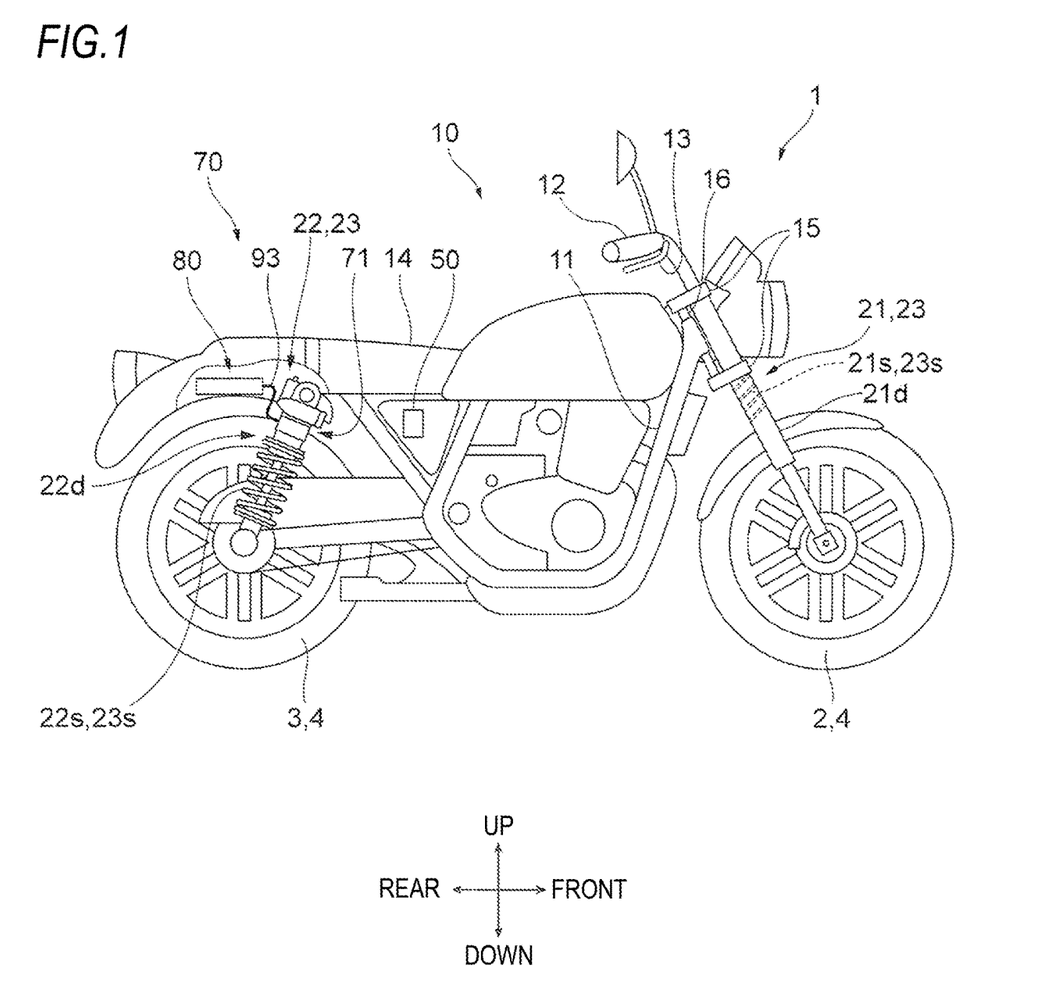
FIG. 1 is a diagram for illustrating an example of a schematic configuration of a motorcycle 1 according to a first embodiment.

FIG. 1 is a diagram for illustrating an example of a schematic configuration of a motorcycle 1 according to a first embodiment.

Figure 2:
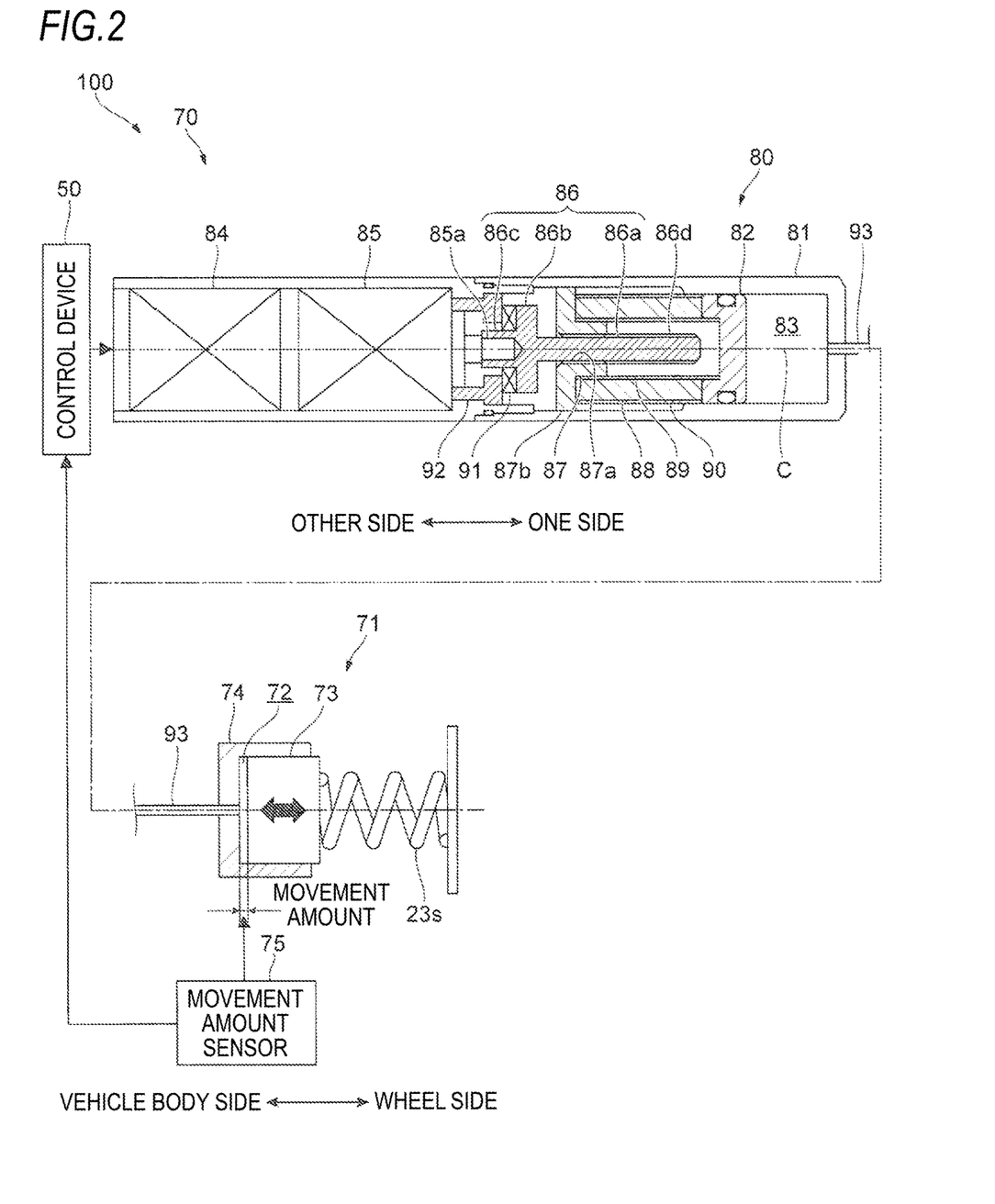
FIG. 2 is a diagram for illustrating an example of a schematic configuration of a vehicle height adjustment device 100 according to the first embodiment.

FIG. 2 is a diagram for illustrating an example of a schematic configuration of a vehicle height adjustment device 100 according to the first embodiment.

The motorcycle 1 as an example of a straddle-type vehicle includes a front wheel 2, which is a wheel on a front side, and a rear wheel 3, which is a wheel on a rear side. The motorcycle 1 also includes a vehicle body 10 including a vehicle body frame 11 forming a skeleton of the motorcycle 1, a handlebar 12, a brake lever 13, and a seat 14. In the following description, the front wheel 2 and the rear wheel 3 may be collectively referred to as "wheels 4".

The motorcycle 1 includes front forks 21 on left and right sides of the front wheel 3, respectively, as an example of a first suspension system which connects the front wheel 2 and the vehicle body 10. The motorcycle 1 also includes two brackets 15 holding the two front forks 21 disposed on the left and right sides of the front wheel 2 respectively, and a shaft 16 disposed between the two brackets 15. The shaft 16 is rotatably supported by the vehicle body frame 11. The front fork 21 includes a suspension spring 21s as an example of a spring which absorbs shock applied to the front wheel 2 from the road surface or the like, and a damping device 21d which damps vibration of the suspension spring 21s.

The motorcycle 1 includes rear suspensions 22 on left and right sides of the rear wheel 3, respectively, as an example of a second suspension system which connects the rear wheel 3 and the vehicle body 10. The rear suspension 22 includes a suspension spring 22s as an example of a spring which absorbs shock applied to the rear wheel 3 from the road surface or the like, and a damping device 22d which damps vibration of the suspension spring 22s.

In the following description, the front fork 21 and the rear suspension 22 may be collectively referred to as "suspension devices 23". The suspension spring 21s and the suspension spring 22s may be collectively referred to as "springs 23s".

The motorcycle 1 includes an adjustment unit 70 as an example of a vehicle height adjustment device which adjusts the height of the vehicle body 10, in other words, the vehicle height, by changing an initial load (preload) applied to the spring 23s.

(Adjustment Unit 70)

The adjustment unit 70 is provided in the suspension device 23 and includes a jack unit 71 as an example of a changing unit which changes a length of the spring 23s, and a supply device 80 which supplies oil to the jack chamber 72 of the jack unit 71.

As illustrated in FIG. 2, the jack unit 71 includes a support member 73 which supports an end portion of the spring 23s on the vehicle body 10 side, and a formation member 74 which forms the jack chamber 72 together with the support member 73. The jack unit 71 adjusts the length of the spring 23s by moving the support member 73 according to an amount of oil in the jack chamber 72. The support member 73, the jack chamber 72, and the forming member 74 can be respectively exemplified by the rear suspension or front fork support members, jack chambers, and hydraulic jacks described in JP2018-144650A filed by the present applicant.

The jack unit 71 also includes a movement amount sensor 75 which detects an amount of movement of the support member 73. The amount of movement of the support member 73 detected by the movement amount sensor 75 is the amount of movement when the amount of movement when the support member 73 is positioned at a reference position is set to zero. The reference position is the position of the support member 73 when the oil in the jack chamber 72 is zero.

As illustrated in FIG. 2, the supply device 80 includes a housing 81 which stores oil and a piston 82 having a cylindrical shape which slides within the housing 81. A storage chamber 83 which stores oil is formed in a space surrounded by an inner surface of the housing 81 and the piston 82. The supply device 80 includes a motor 84, a speed reducer 85 which reduces a rotation speed of the motor 84, a screw 86 which is connected to an output shaft 85a of the speed reducer 85, and a control device 50 which controls operation of the motor 84.

The motor 84 can be exemplified as a brushed direct current (DC) motor. The speed reducer 85 can be exemplified as a planetary speed reducer using a well-known planetary gear mechanism The control device 50 will be detailed below.

The screw 86 includes a first part 86a, a second part 86b, and a third part 86c, which are three cylindrical parts with different diameters, in order from one side (right side in FIG. 2, storage chamber 83 side) to the other side (left side in FIG. 2, speed reducer 85 side) in an axis direction of a rotation axis C of the screw 86. An outer diameter of the second part 86b is larger than an outer diameter of the first part 86a and an outer diameter of the third part 86c. A male thread 86d is formed on an outer peripheral surface of the first part 86a. The output shaft 85a of the speed reducer 85 is fitted inside the third part 86c. Thereby, the screw 86 rotates integrally with the output shaft 85a of the speed reducer 85. In the following description, the axial direction of the rotation axis C may be simply referred to as an "axial direction".

The supply device 80 includes a nut 87 formed with a female thread 87a which meshes with the male thread 86d formed on the first part 86a of the screw 86. The nut 87 includes a flange 87b at an end portion on the speed reducer 85 side.

The supply device 80 includes an intervening member 88 intervening between the flange 87b of the nut 87 and the piston 82, a collar 89 having a cylindrical shape and positioned inside the intervening member 88 and outside the nut 87, and a collar 90 having a cylindrical shape and positioned outside the intervening member 88. The intervening member 88 is an elastic member, and is pinched between the piston 82 and the flange 87b of the nut 87 while being elastically deformed by pressure from the piston 82 receiving force from the oil. As a result, the intervening member 88 prevents the nut 87 from rotating as the screw 86 rotates.

The supply device 80 includes a bearing 91 which rotatably supports the screw 86, a support member 92 which supports the bearing 91, and a hose 93 which distributes oil between the storage chamber 83 and the jack chamber 72. The bearing 91 is disposed between the support member 92 and the second part 86b of the screw 86.

Figure 3:
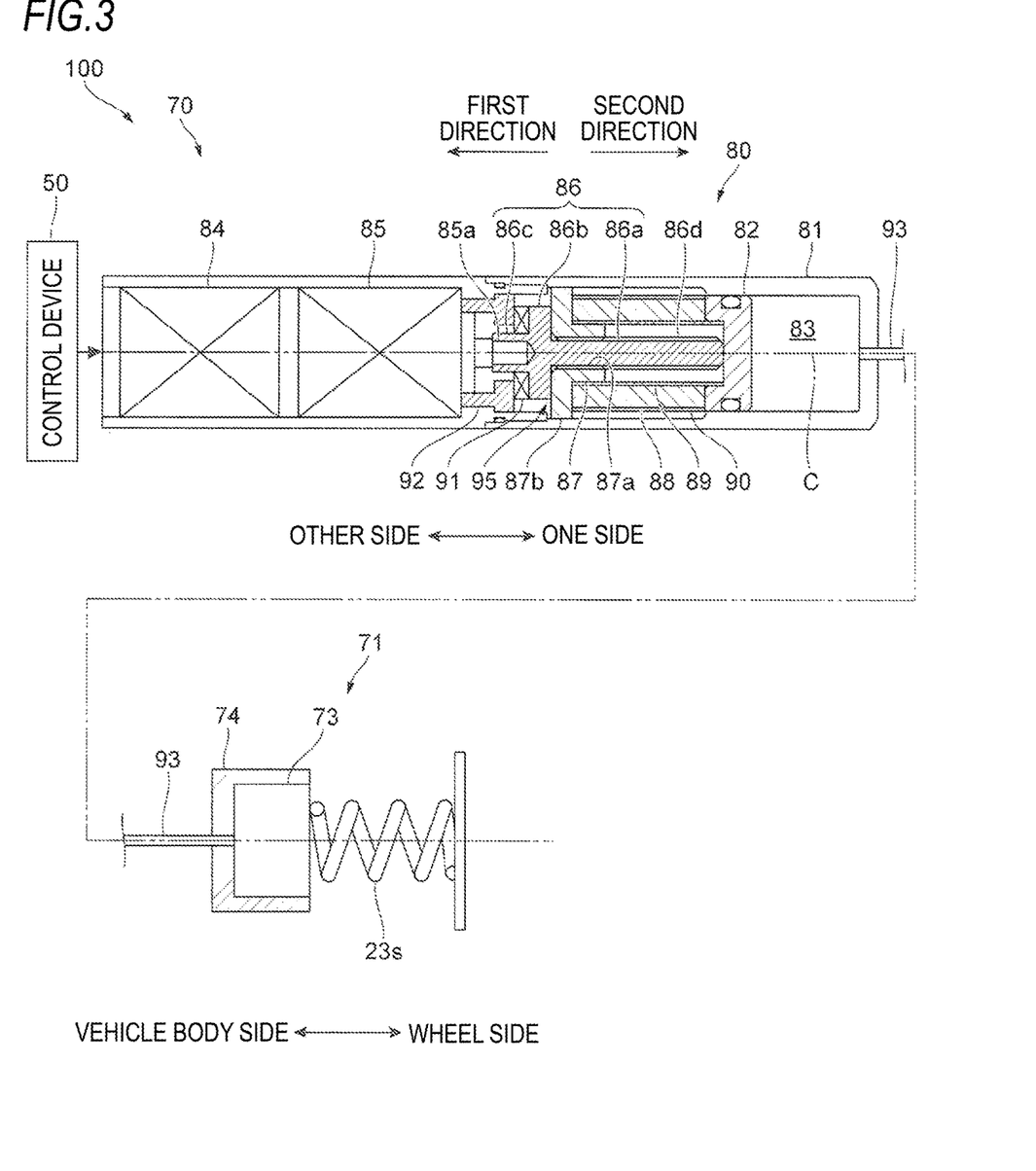
FIG. 3 is a diagram for illustrating an example of a state in which a flange 87b of a nut 87 and a second part 86b of a screw 86 are in contact with each other.

FIG. 3 is a diagram for illustrating an example of a state in which the flange 87b of the nut 87 and the second part 86b of the screw 86 are in contact with each other. As illustrated in FIG. 3, a first direction in the axial direction corresponds to the other side, and a second direction in the axial direction corresponds to one side.

In the adjustment unit 70 configured as above, rotation of a shaft of the motor 84 of the supply device 80 in a first rotation direction causes the screw 86 to rotate in the first rotation direction and the nut 87 to move axially in the first direction. Then, the piston 82, which receives a force of the oil in the storage chamber 83, moves in the first direction in the axial direction. As the piston 82 moves in the first direction, a volume of the storage chamber 83 increases. The support member 73 is caused to drain the oil in the jack chamber 72 and supply the oil to the storage chamber 83. As a result, the support member 73 moves toward the vehicle body 10 side (left side in FIG. 3) with respect to the formation member 74. In other words, an amount of movement of the support member 73 from the reference position becomes smaller, and a spring length of the spring 23s becomes longer. As the spring length of the spring 23s increases, an initial load decreases and the height of the vehicle body 10 decreases (the vehicle height decreases).

When the shaft of the motor 84 continues to rotate in the first rotation direction, as illustrated in FIG. 3, the flange 87b of the nut 87 abuts (comes in contact with) on the second part 86b of the screw 86, and thus the nut 87 stops moving in the first direction. In other words, the supply device 80 includes a contact portion 95, which is a portion where the flange 87b of the nut 87 and the second part 86b of the screw 86 come into contact at a location different from a fitting portion between the male thread 86d and the female thread 87a, and as a result, movement of the nut 87 in the first direction stops.

On the other hand, rotation of the shaft of the motor 84 of the supply device 80 in a second rotation direction opposite to the first rotation direction causes the screw 86 to rotate in the second rotation direction and the nut 87 to move axially in the second direction. As the nut 87 moves, the collar 89, the collar 90, and the intervening member 88 receive a force in the second direction and move the piston 82 in the second direction. Thereby, the piston 82 is caused to discharge the oil from the storage chamber 83. The oil is then supplied into the jack chamber 72 via the hose 93. As a result, the support member 73 moves to a wheel side (right side in FIG. 3) with respect to the formation member 74. In other words, the amount of movement of the support member 73 from the reference position increases, and the spring length of the spring 23s shortens. As a result, the initial load of the spring 23s increases, and the height of the vehicle body 10 rises (the vehicle height increases).

For example, when the nut 87 moves in the second direction in the axial direction due to the rotation of the shaft of the motor 84 in the second rotation direction from the state of having the contact portion 95 illustrated in FIG. 3, the flange 87b of the nut 87 and the second portion 86b of the screw 86 are out of contact. Thereby, the contact portion 95 does not exists in the supply device 80, for example as illustrated in FIG. 2.

In the configuration described above, the intervening member 88 intervening between the flange 87b of the nut 87 and the piston 82, the collar 89, and the collar 90 move the piston 82 in the second direction according to movement of the nut 87 in the second direction and restrict the nut 87 from rotating as the screw 86 rotates. However, it is not particularly limited thereto. For example, a portion of the nut 87 on the storage chamber 83 side may be brought into contact with the piston 82 to move the piston 82 in the second direction as the nut 87 moves in the second direction. Then, for example, by fitting a spherical member into a recess portion formed in a member disposed between the nut 87 and the housing 81 and a recess portion formed in a portion of the nut 87 facing the recess portion, the rotation of the nut 87 as the screw 86 rotates may be prevented.

(Control Device 50)

Next, the control device 50 will be described.

Figure 4:
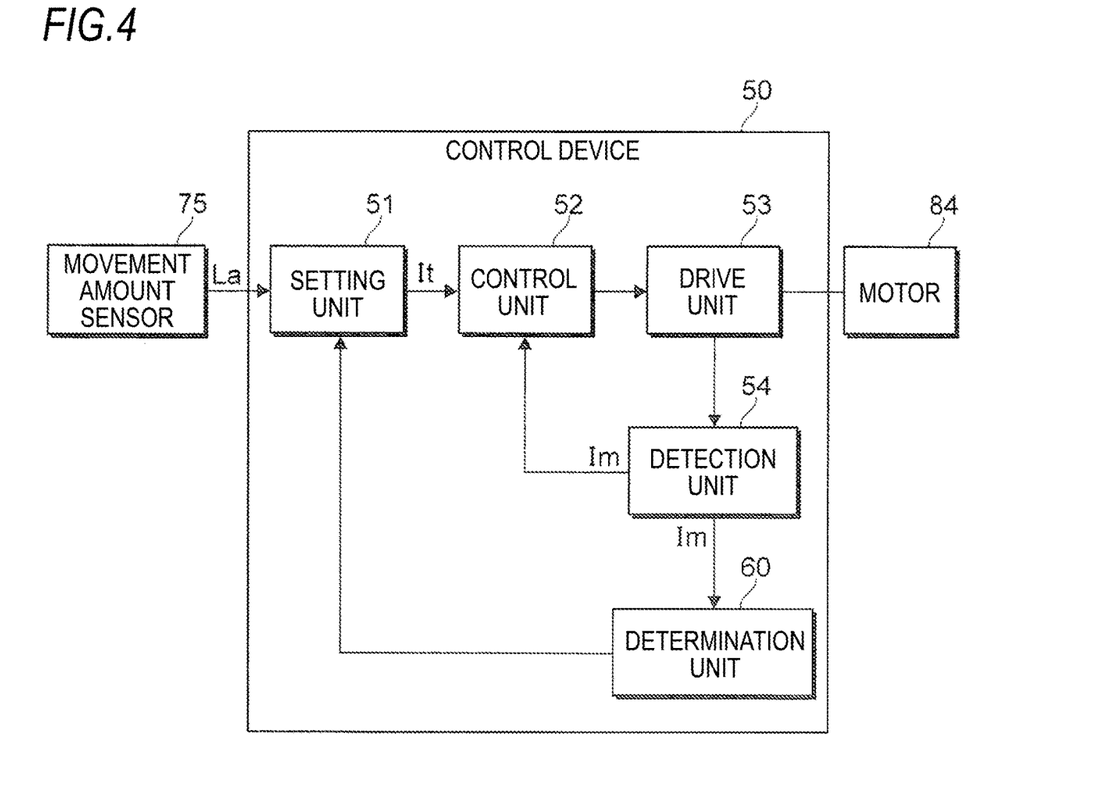
FIG. 4 is a diagram for illustrating an example of a block diagram of a control device 50.

FIG. 4 is a diagram for illustrating an example of a block diagram of the control device 50.

The control device 50 includes a CPU, a ROM which stores programs executed by the CPU and various data, a RAM which is used as a working memory for the CPU, and an EEPROM which is a non-volatile memory. An output signal from the movement amount sensor 75 or the like is input to the control device 50.

The control device 50 includes a setting unit 51 for setting a target current It supplied to the motor 84, a control unit 52 for controlling driving of the motor 84, and a drive unit 53 for driving the motor 84. The control device 50 includes a detection unit 54 which detects a motor current Im which actually flows through the motor 84, and a determination unit 60 which determines whether the contact portion 95 exists, which is a portion where the flange 87b of the nut 87 and the second part 86b of the screw 86 are in contact with each other, using the motor current Im detected by the detection unit 54. Processing by the setting unit 51, the control unit 52, and the determination unit 60 is realized by the CPU executing software stored in a storage area such as the ROM.

The control unit 52 performs feedback control so that a deviation between the target current It set by the setting unit 51 and the motor current Im detected by the detection unit 54 becomes zero.

The drive unit 53 includes, for example, a transistor (PET) as a switching element connected between a positive line of a power supply and a coil of the motor 84. The drive unit 53 controls the driving of the motor 84 by driving a gate of the transistor to switch the transistor.

The detection unit 54 detects the motor current Im flowing through the motor 84 from voltage generated across a shunt resistor connected to the drive unit 53.

(Setting Unit 51)

The setting unit 51 sets a target current It for moving the piston 82 so that a target value Lt of the movement amount of the support member 73 and a detection value La grasped using an output value of the movement amount sensor 75 match. The target value Lt can be exemplified as a value corresponding to a target vehicle height selected by a user via a user interface provided on the motorcycle 1.

When moving the piston 82 in the second direction in the axial direction, which is the direction in which the oil is discharged from the storage chamber 83, the setting unit 51 sets the target current It to a predetermined first value for raising the vehicle height. On the other hand, when the piston 82 is moved in the first direction in the axial direction, which is the direction in which the oil is discharged from the jack chamber 72, the setting unit 51 sets target current It to a predetermined second value for lowering the vehicle height. When the current in the direction to rotate the motor 84 to move the piston 82 in the second direction in the axial direction is set as positive, and the current in the direction to rotate the motor 84 to move the piston 82 in the first direction in the axial direction is set as negative, it can be exemplified that the first value is 8 A and the second value is −8 A.

In determining the movement direction of the piston 82, first, the setting unit 51 determines whether an absolute value of a subtraction value ΔL (=Lt−La) obtained by subtracting the detected value La from the target value Lt is equal to or less than a predetermined reference value. Then, when the absolute value of the subtraction value ΔL is equal to or less than the reference value (|ΔL|≥reference value), the setting unit 51 sets the target current It to zero. On the other hand, when the absolute value of the subtraction value ΔL is greater than the reference value (|ΔL|>reference value), the setting unit 51 determines whether the subtraction value ΔL is greater than zero. When the subtraction value ΔL is greater than zero (ΔL>0), the movement amount of the support member 73 is less than the target value Lt, so the setting unit 51 sets the target current It to the first value to move the piston 82 in the second direction in the axial direction. On the other hand, when the subtraction value ΔL is smaller than zero (ΔL<0), the support member 73 has moved beyond the target value Lt, so the setting unit 51 sets the target current It to the second value to move the piston 82 in the first direction in the axial direction.

When the determination unit 60 determines that the contact portion 95, where the flange 87b of the nut 87 and the second part 86b of the screw 86 are in contact with each other, exists, the setting unit 51 performs return control which moves the nut 87 in the second direction until the contact portion 95 no longer exists.

As the return control, the setting unit 51 performs setting processing of the target current It described below. That is, first, the setting unit 51 stops energizing the motor 84 (It=0). Then, the setting unit 51 sets the target current It to a third value when a predetermined first period elapses after the energization is stopped. Then, the setting unit 51 stops energization when a predetermined second period elapses after setting the target current It to the third value.

The first period can be exemplified as one second, for example. However, the first period may be zero. The second period is a period sufficient to eliminate the contact state between the flange 87b of the nut 87 and the second part 86b of the screw 86 by setting the target current It to a third value. The second period can be exemplified to be two seconds, for example. The third value can be exemplified as 8 A, as similar to the first value.

(Determination Unit 60)

The determination unit 60 uses the value of current supplied to the motor 84 to determine whether the contact portion 95 exists. More specifically, when the target current It is set to the second value (for example, −8 A), if a period during which the motor current Im detected by the detection unit 54 is below a predetermined threshold exceeds a predetermined reference period, the determination unit 60 determines that the contact portion 95 exists. On the other hand, even when the motor current Im is below the threshold if the period during which the current is below the threshold does not exceed the reference period, the determination unit 60 determines that the contact portion 95 does not exist. The threshold is −10 A and the reference period is 300 milliseconds.

Figure 5:
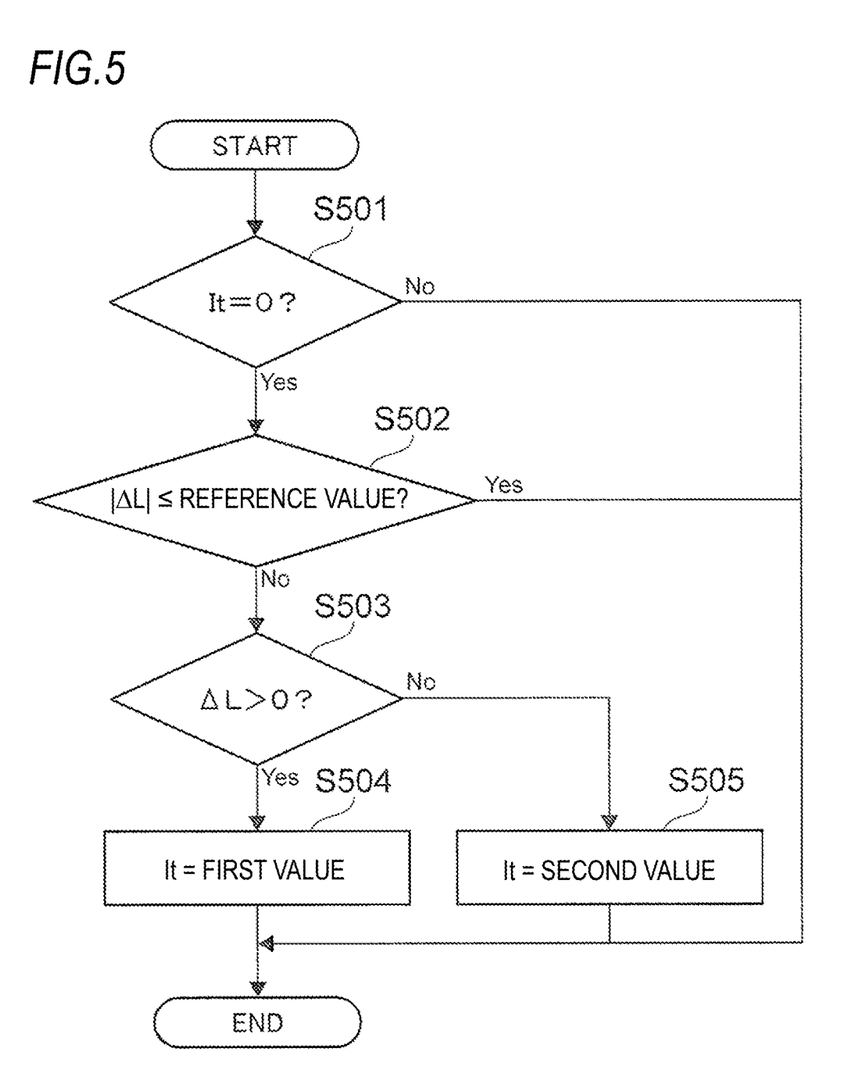
FIG. 5 is a flowchart for illustrating an example of a procedure for setting a target current It performed by a setting unit 51.

FIG. 5 is a flowchart for illustrating an example of a procedure for setting the target current It performed by the setting unit 51.

The setting unit 51 repeatedly executes the setting procedure, for example, at a predetermined control cycle (for example, every 1 millisecond).

The setting unit 51 first determines whether the target current It is 0 (S501). When the target current It is not 0 (No in S501), the setting unit 51 finishes the procedure. On the other hand, when the target current It is 0 (Yes in S501), the setting unit 51 determines whether an absolute value of the subtraction value ΔL (=Lt−La) is equal to or less than the reference value (S502). When the absolute value of the subtraction value ΔL is equal to or less than the reference value (Yes in S502), the setting unit 51 finishes the procedure.

When the absolute value of the subtraction value ΔL is greater than the reference value (No in S502), it is determined whether the subtraction value ΔL is greater than 0 (S503). Then, when the subtraction value ΔL is greater than 0 (Yes in S503), the setting unit 51 sets the target current It to the first value to move the piston 82 in the second direction in the axial direction (S504). On the other hand, when the subtraction value ΔL is not greater than 0 (No in S503), the setting unit 51 sets the target current It to the second value to move the piston 82 in the first direction in the axial direction (S505).

Figure 6:
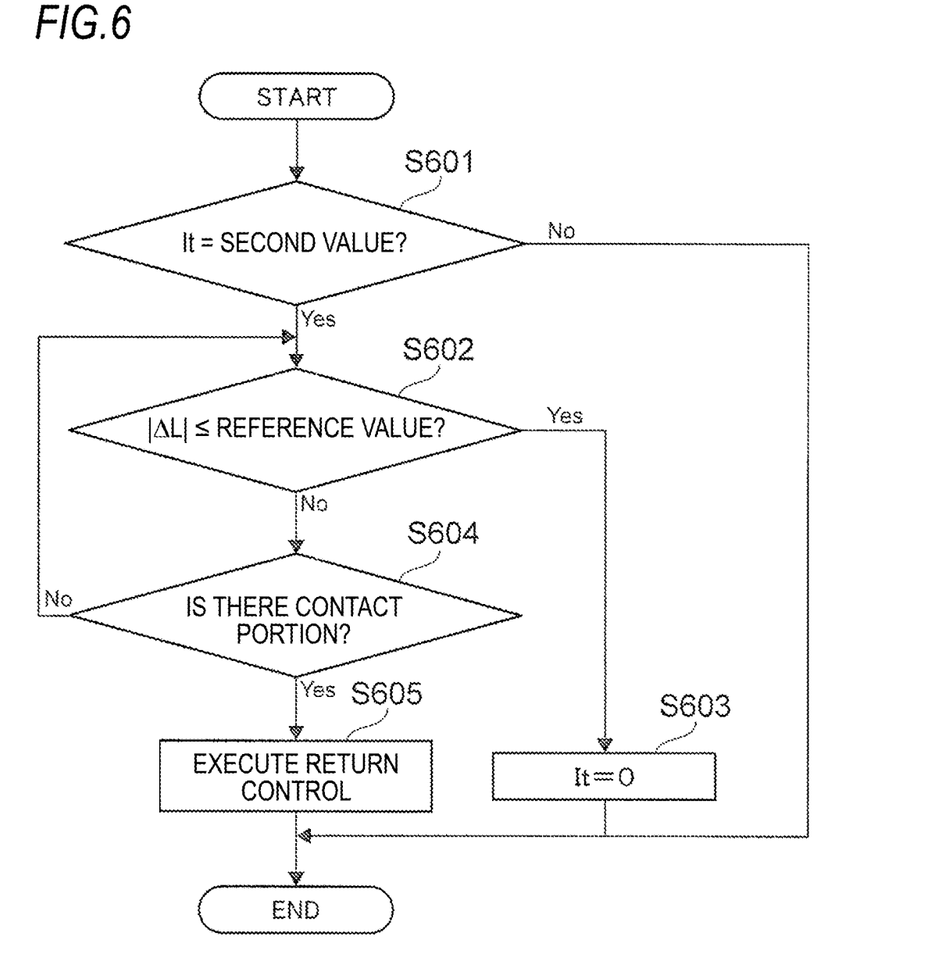
FIG. 6 is a flowchart for illustrating an example of a procedure for setting the target current It performed by the setting unit 51.

FIG. 6 is a flowchart illustrating an example of a procedure for setting the target current It performed by the setting unit 51.

The setting unit 51 repeatedly executes the setting procedure, for example, at a predetermined control cycle (for example, every 1 millisecond).

The setting unit 51 first determines whether the target current It is the second value (S601). When the target current It is not the second value (No in S601), the setting unit 51 finishes the procedure. On the other hand, when the target current It is the second value (Yes in S601), the setting unit 51 determines whether the absolute value of the subtraction value ΔL is equal to or less than the reference value (S602). When the absolute value of the subtraction value ΔL is equal to or less than the reference value (Yes in S602), the setting unit 51 sets the target current It to 0 (S603).

On the other hand, when the absolute value of the subtraction value ΔL is greater than the reference value (No in S602), the setting unit 51 determines whether the determination unit 60 determined that the contact portion 95 exists (S604). When the determination unit 60 did not determine that the contact portion 95 exists (No in S604), the setting unit 51 performs the processing from S602 onwards. On the other hand, when the determination unit 60 determined that the contact portion 95 exists (Yes in S604), the setting unit 51 performs return control (S605).

In the vehicle height adjustment device 100 configured as described above, when the power of the motorcycle 1 is turned on, power is supplied from a battery (not illustrated) to the motor 84 and the control device 50 so that the vehicle height can be adjusted. On the other hand, when the power of the motorcycle 1 is turned off, the power supply from the battery to the motor 84 and the control device 50 is stopped, making it not possible to adjust the vehicle height.

(Operation)

The supply device 80 is an example of a fluid supply device including the motor 84, the speed reducer 85 connected to a rotation shaft of the motor 84, the screw 86 connected to the speed reducer 85, and the nut 87 as an example of a nut member which is fitted to the screw 86 and moves in the axial direction of the rotation axis C of the screw 86 as the screw 86 rotates. The supply device 80 includes the piston 82 which is axially movable due to axial movement of the nut 87, the storage chamber 83 which stores oil as an example of a fluid of which the storage capacity increases or decreases as the piston 82 moves in the axial direction, and the control device 50 which controls the operation of the motor 84. The fluid is not limited to oil. The fluid may be air. The control device 50 includes the determination unit 60 determining whether the contact portion 95 exists, the contact portion 95 being a portion where the screw 86 and the nut 87 come into contact at a location different from the male thread 86d and the female thread 87a, which are examples of the fitted portions. When the determination unit 60 determines that the contact portion 95 exists while energizing the motor 84 to move the nut 87 in the first direction, the control device 50 energizes motor 84 to move the nut 87 in the second direction opposite to the first direction until the contact portion 95 no longer exists.

In other words, the control method of the motor 84 performed by the control device 50 has a determination process (S604) to determine whether the contact portion 95 exists when the motor 84 is energized to move the nut 87 in the first direction. The control method of the motor 84 performed by the control device 50 has a return process (S605) where, when the determination process determines that the contact portion 95 exists, the motor 84 is energized to move the nut 87 in the second direction in an opposite direction to the first direction until the contact portion 95 no longer exists.

More specifically, for example, when the absolute value of the subtraction value ΔL becomes larger than the reference value and the subtraction value ΔL becomes smaller than 0 due to a decrease in the target value Lt, the setting unit 51 of the control device 50 sets the target current It to the second value. The setting causes the shaft of the motor 84 to rotate in the first rotation direction, and the nut 87 to move in the first direction in the axial direction. Then, the setting unit 51 sets the target current It to 0 and stops driving of the motor 84 when the absolute value of the subtraction value ΔL becomes equal to or less than the reference value. However, for example, even when the movement amount sensor 75 is out of order and an actual amount of movement of the support member 73 reaches the target value Lt, the driving of the motor 84 does not stop unless the absolute value of the subtraction value ΔL becomes equal to or less than the reference value. Here, when the determination unit 60 determines that the contact portion 95 exists, the setting unit 51 performs return control. The control causes the nut 87 to move in the second direction until the contact portion 95 no longer exists.

Here, the control device that stops the energization of the motor 84 and does not perform the return control when a period during which the motor current Im exceeds the threshold is longer than the predetermined reference period due to contact between the flange 87b of the nut 87 and the second part 86b of the screw 86 is referred to as a control device according to a comparative example. In the control device according to the comparative example, unlike the control device 50 according to the present embodiment, the energization to the motor 84 is stopped while the flange 87b of the nut 87 and the second part 86b of the screw 86 are in contact with each other. When the energization to the motor 84 is stopped, a gear of the speed reducer 85 intervening between the motor 84 and the screw 86 reversely rotates by the backlash and stops. Then, for example, when the power of the motorcycle 1 is turned off here, and then the power of the motorcycle 1 is turned on again, for example, if the movement amount sensor 75 is out of order, the control device according to the comparative example rotates the shaft of the motor 84 in the first rotation direction so that the actual amount of movement of the support member 73 becomes the target value Lt. Then, the gears of the speed reducer 85 may mesh with each other after the motor 84 rotates in a no-load state and a rotation speed increases. However, since the flange 87b of the nut 87 and the second part 86b of the screw 86 are in contact with each other, the screw 86 does not rotate and a large load is applied to the gear of the speed reducer 85. For example, when the speed reducer 85 has multiple stages, when there is a gap between teeth of the gears of the speed reducer (hereinafter sometimes referred to as a "last stage speed reducer") closest to the screw 86 among the multiple stages, the speed reducers closer to the motor 84 than the last stage speed reducer (hereinafter sometimes referred to as a "front and rear stage speed reducers") rotate until the gap is filled and the teeth come into contact with each other. After the rotation speed of a front stage speed reducer increases, the teeth of the gears of the last stage speed reducer come into contact with each other, and thus the rotation of the front stage speed reducer stops. Therefore, durability of the teeth of the gears of the front stage speed reducer may decrease. Alternatively, even when the flange 87b of the nut 87 and the second part 86b of the screw 86 are in contact with each other, the screw 86 is further rotated after the teeth of the gears of the last stage speed reducer come into contact with each other. Therefore, contact pressure between the nut 87 and the screw 86 increases, and the nut 87 or the screw 86 may be worn, resulting in reduced durability.

Conversely, the control device 50 according to the present embodiment performs the return control to stop the energization of the motor 84 in a state where the flange 87b of the nut 87 and the second part 86b of the screw 86 are not in contact with each other. Therefore, when after the power of the motorcycle 1 is turned off here, the power of motorcycle 1 is turned on again and the shaft of the motor 84 is rotated in the first rotation direction so that the actual amount of movement of the support member 73 becomes the target value Lt, the nut 87 moves in the first direction. Then, even when the flange 87b of the nut 87 and the second part 86b of the screw 86 come into contact with each other due to, for example, the movement amount sensor 75 being out of order, when contact is made, the motor 84 is loaded enough to move the nut 87. Therefore, even when the rotation of the speed reducer 85 stops due to the contact between the nut 87 and the screw 86, the rotation speed of the speed reducer 85 here is less than when the speed reducer 85 stopped rotating while the motor 84 was rotating with no load. Therefore, as the rotation of the speed reducer 85 stops, an impact force generated on the teeth of the gears of the speed reducer 85 is reduced, so that deterioration of the durability of the teeth of the gears of the speed reducer 85 is prevented. Further increase in a contact pressure between the nut 87 and the screw 86 due to the rotation of the shaft of the motor 84 in the first rotation direction when the power of the motorcycle 1 is turned on while the flange 87b of the nut 87 and the second part 86b of the screw 86 are in contact with each other is prevented. Therefore, abrasion of the nut 87 or the screw 86 and reduction in durability are prevented.

Second Embodiment

Figure 7:
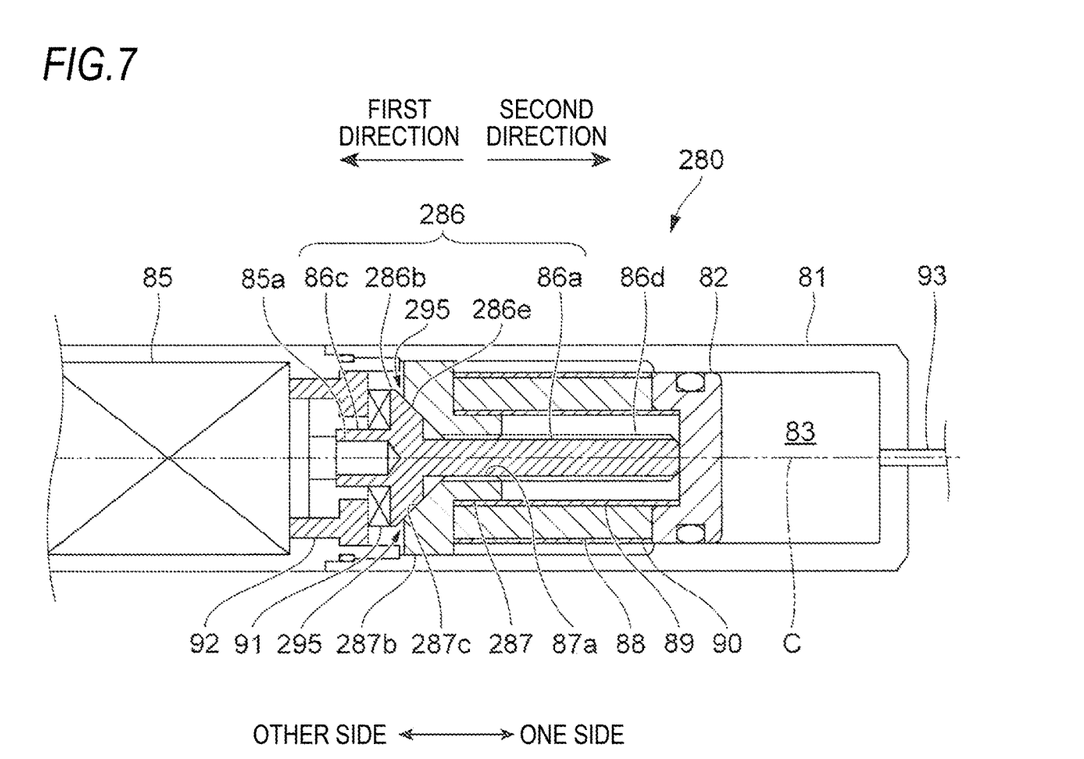
FIG. 7 is a diagram for illustrating an example of a schematic configuration of a supply device 280 according to a second embodiment.

FIG. 7 is a diagram for illustrating an example of a schematic configuration of a supply device 280 according to a second embodiment.

The supply device 280 according to the second embodiment differs from the supply device 80 according to the first embodiment in the shape of the screw 86 and nut 87. Differences from the first embodiment will be described below. The same reference numerals are used for the similar components in the first embodiment and the second embodiment, and detailed description thereof will be omitted.

A screw 286 according to the second embodiment includes the first part 86a, a second part 286b, and the third part 86c. A nut 287 according to the second embodiment includes a flange 287b at an end portion on the speed reducer 85 side. A surface 286e of the second part 286b facing the flange 287b extends in a direction intersecting with the rotation axis C. A surface 287c of the flange 287b facing the second part 286b extends in the direction intersecting with the rotation axis C. An angle between the surface 286e of the second part 286b and the rotation axis C and an angle between the surface 287c of the flange 287b and the rotation axis C are the same.

In the screw 286 and the nut 287 configured as described above, the surface 287c of the nut 287 are in contact with the surface 286e of the screw 286, thereby preventing movement of the nut 287 with respect to the screw 286. In other words, the supply device 280 includes a contact portion 295 where the surface 287c of the nut 287 and the surface 286e of the screw 286 are in contact, thereby stopping the movement of the nut 287 in the first direction.

Thus, the contact portion 295 includes the surface 286e as an example of a first surface provided on the screw 286 and extending in the direction intersecting with the rotation axis C, and the surface 287c as an example of a second surface provided on the nut 287 and extending to face the surface 286e. Accordingly, when the nut 287 hits the screw 286, a surface pressure generated on the surfaces 286e and 287c is smaller than when these surfaces extend perpendicular to the rotation axis C. Therefore, the wear of the surface 286e and the surface 287c can be prevented, and thus the durability of the screw 286 and nut 287 can be easily improved.

Third Embodiment

Figure 8:
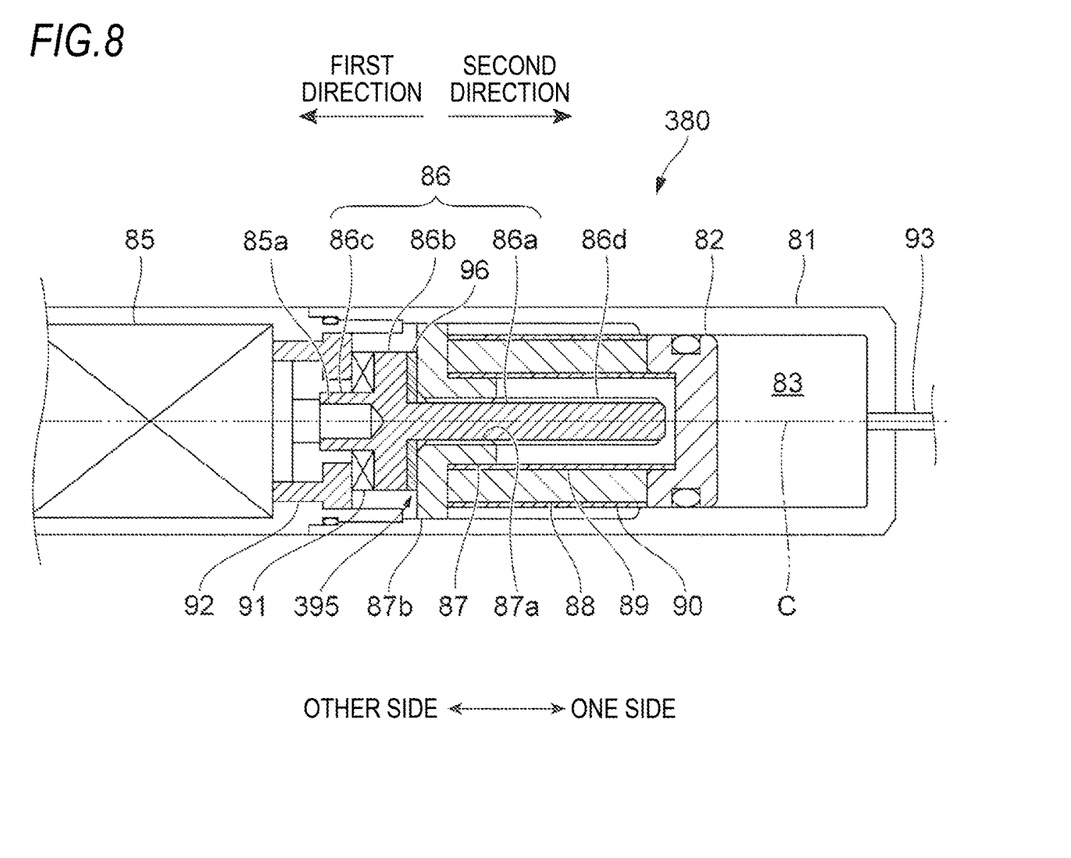
FIG. 8 is a diagram for illustrating an example of a schematic configuration of a supply device 380 according to a third embodiment.

FIG. 8 is a diagram for illustrating an example of a schematic configuration of a supply device 380 according to a third embodiment.

The supply device 380 according to the third embodiment differs from the supply device 80 according to the first embodiment in that an elastic member 96 is provided between the screw 86 and the nut 87. Differences from the first embodiment will be described below. The same reference numerals are used for the similar components in the first embodiment and the third embodiment, and detailed description thereof will be omitted.

The elastic member 96 is a disc-shaped member having a through-hole formed in a center for the first part 86a of the screw 86 to pass through. A material of the elastic member 96 can be exemplified by resin such as polyurethane.

In the supply device 380 according to the third embodiment configured as described above, when the shaft of the motor 84 continues to rotate in the first rotation direction, the flange 87b of the nut 87 comes into contact with the elastic member 96, and the elastic member 96 comes into contact with the second part 86b of the screw 86, which stops moving in the first direction of the nut 87. In other words, the supply device 380 includes the elastic member 96 with elasticity in the axial direction, and by a contact portion 395 in which the screw 86 and the nut 87 come into contact through the elastic member 96, moving in the first direction of the nut 87 stops. Accordingly, since the rotation speed of the screw 86 is reduced by making the nut 87 into contact with the elastic member 96, an impact power generated in the teeth of the gears of the speed reducer 85 when the rotation of the screw 86 is stopped is reduced. As a result, it is easy to improve the durability of the gears of the speed reducer 85.

The elastic member corresponding to the elastic member 96 may be provided between the surface 286e of the screw 286 and the surface 287c of the nut 287 according to the second embodiment, and the screw 286 and the nut 287 may be brought into contact via the elastic member.

Fourth Embodiment

A control device of a supply device according to a fourth embodiment differs in current value setting from the control devices of the supply devices 80, 280, and 380 according to the first, second, and third embodiments. Differences from the first embodiment will be described below. The same reference numerals are used for the similar components in the first embodiment and the fourth embodiment, and detailed description thereof will be omitted.

The control device according to the fourth embodiment makes an absolute value of the second value as an example of a second current value supplied to the motor 84 when moving the nut 87 in the first direction smaller than an absolute value of the third value as an example of a first current value supplied to the motor 84 when the nut 87 is moved in the second direction during return control. For example, it can be exemplified that the second value is −4 A and the third value is 8 A. Here, the first value may be 4 A, which is smaller than the third value, or may be 8 A, which is the same as the third value. Alternatively, it can be exemplified that the second value is −8 A and the third value is 12 A. Here, the first value may be 8 A, which is smaller than the third value, or may be 12 A, which is the same as the third value.

As such, by making the absolute value of the target current It (second value) for moving the nut 87 in the first direction smaller than the absolute value of the target current It (third value) for moving the nut 87 in the second direction during return control, it becomes possible to reduce the rotation speed of the motor 84 when the nut 87 hits the screw 86. As a result, an impact force generated on the teeth of the gears of the speed reducer 85 when the nut 87 hits the screw 86 is reduced, so the durability of the teeth of the gears of the speed reducer 85 can be easily improved. Since a contact pressure between the nut 87 and the screw 86 when the nut 87 hits the screw 86 is reduced, the durability of the nut 87 or the screw 86 can be easily improved.

In the description described above, a motorcycle is exemplified as a saddle-ride type vehicle, but the form of the saddle-ride type vehicle of the present invention is not limited thereto. The straddle-type vehicle of the present invention may be a vehicle in which a passenger straddles a seat, and the number of wheels can be any number of two or more.

The invention claimed is:

1. A motor control method for controlling an operation of a motor in a fluid supply device including the motor, a speed reducer connected to an output shaft of the motor, a screw connected to the speed reducer, a nut member which is fitted to the screw and moves in an axial direction of a rotation shaft of the screw as the screw rotates, a piston movable in the axial direction due to the nut member moving in the axial direction, and a storage chamber configured to store fluid of which a capacity increases or decreases as the piston moves in the axial direction, the method comprising the steps of:

determining whether a contact portion exists, which is a portion where the screw and the nut member are in contact with each other at a location different from a mating portion, when the motor is energized to move the nut member in a first direction; and     energizing the motor to move the nut member in a second direction opposite to the first direction until the contact portion no longer exists when the contact portion is determined to exist.

2. The motor control method according to claim 1, wherein in the determining step, determining whether the contact portion exists by using a value of current supplied to the motor.

3. A fluid supply device, comprising:

a motor;

a speed reducer connected to a rotation shaft of the motor;

a screw connected to the speed reducer;

a nut member which is fitted to the screw and moves in an axial direction of a rotation shaft of the screw as the screw rotates;

a piston movable in the axial direction due to the nut member moving in the axial direction;

a storage chamber configured to store fluid of which a capacity increases or decreases as the piston moves in the axial direction; and     a control device configured to control an operation of the motor, wherein:

the control device includes a determination unit configured to determine whether a contact portion exists, which is a portion where the screw and the nut member are in contact with each other at a location different from a mating portion; and when the determination unit determines that the contact portion exists while the motor is energized to move the nut member in a first direction, the control device is configured to energize the motor to move the nut member in a second direction opposite to the first direction until the contact portion no longer exists.

4. The fluid supply device according to claim 3, wherein the determination unit determines whether the contact portion exists by using a value of current supplied to the motor.

5. The fluid supply device according to claim 4, wherein the contact portion includes:
   a first surface provided on the screw and extending in a direction intersecting the rotation shaft of the screw; and
   a second surface provided on the nut member and extending to face the first surface.

6. The fluid supply device according to claim 4, wherein the contact portion includes an elastic member having elasticity in the axial direction, and the screw and the nut member are in contact with each other through the elastic member.

7. The fluid supply device according to claim 4, wherein the control device makes an absolute value of a second current value smaller than an absolute value of a first current value until the contact portion no longer exists, the second current value being supplied to the motor when moving the nut member in the first direction, the first current value being supplied to the motor when moving the nut member in the second direction.

8. A vehicle height adjustment device, comprising:
the fluid supply device according to claim 4; and
a changing unit configured to change a length of a spring of a suspension device disposed between a vehicle body and a wheel using the fluid supplied by the fluid supply device.

9. A saddle-type vehicle, comprising:
a vehicle body;
a front wheel disposed on a front side of the vehicle body, and a rear wheel disposed on a rear side of the vehicle body;
a first suspension device disposed between the vehicle body and the front wheel;
a second suspension device including a spring disposed between the vehicle body and the rear wheel; and
the vehicle height adjustment device capable of adjusting a load of the spring in the second suspension device using the fluid supplied by the fluid supply device according to claim 4.

10. The fluid supply device according to claim 3, wherein the contact portion includes:
   a first surface provided on the screw and extending in a direction intersecting the rotation shaft of the screw; and
   a second surface provided on the nut member and extending to face the first surface.

11. The fluid supply device according to claim 10, wherein
   the contact portion includes an elastic member having elasticity in the axial direction, and the screw and the nut member are in contact with each other through the elastic member.

12. The fluid supply device according to claim 10, wherein
   the control device makes an absolute value of a second current value smaller than an absolute value of a first current value until the contact portion no longer exists, the second current value being supplied to the motor when moving the nut member in the first direction, the first current value being supplied to the motor when moving the nut member in the second direction.

13. A vehicle height adjustment device, comprising:
the fluid supply device according to claim 10; and
a changing unit configured to change a length of a spring of a suspension device disposed between a vehicle body and a wheel using the fluid supplied by the fluid supply device.

14. A saddle-type vehicle, comprising:
a vehicle body;
a front wheel disposed on a front side of the vehicle body, and a rear wheel disposed on a rear side of the vehicle body;
a first suspension device disposed between the vehicle body and the front wheel;
a second suspension device including a spring disposed between the vehicle body and the rear wheel; and
the vehicle height adjustment device capable of adjusting a load of the spring in the second suspension device using the fluid supplied by the fluid supply device according to claim 10.

15. The fluid supply device according to claim 3, wherein the contact portion includes an elastic member having elasticity in the axial direction, and the screw and the nut member are in contact with each other through the elastic member.

16. The fluid supply device according to claim 15, wherein
   the control device makes an absolute value of a second current value smaller than an absolute value of a first current value until the contact portion no longer exists, the second current value being supplied to the motor when moving the nut member in the first direction, the first current value being supplied to the motor when moving the nut member in the second direction.

17. A vehicle height adjustment device, comprising:
the fluid supply device according to claim 15; and
a changing unit configured to change a length of a spring of a suspension device disposed between a vehicle body and a wheel using the fluid supplied by the fluid supply device.

18. The fluid supply device according to claim 3, wherein the control device makes an absolute value of a second current value smaller than an absolute value of a first current value until the contact portion no longer exists, the second current value being supplied to the motor when moving the nut member in the first direction, the first current value being supplied to the motor when moving the nut member in the second direction.

19. A vehicle height adjustment device, comprising:
the fluid supply device according to claim 3; and
a changing unit configured to change a length of a spring of a suspension device disposed between a vehicle body and a wheel using the fluid supplied by the fluid supply device.

20. A saddle-type vehicle, comprising:
a vehicle body;
a front wheel disposed on a front side of the vehicle body, and a rear wheel disposed on a rear side of the vehicle body;
a first suspension device disposed between the vehicle body and the front wheel;

a second suspension device including a spring disposed between the vehicle body and the rear wheel; and the vehicle height adjustment device capable of adjusting a load of the spring in the second suspension device using the fluid supplied by the fluid supply device according to claim 3.

* * * * *